May 27, 1969 J. L. FISCHER ET AL 3,447,096
MULTIFREQUENCY SIGNAL GENERATOR
Filed Aug. 17, 1965
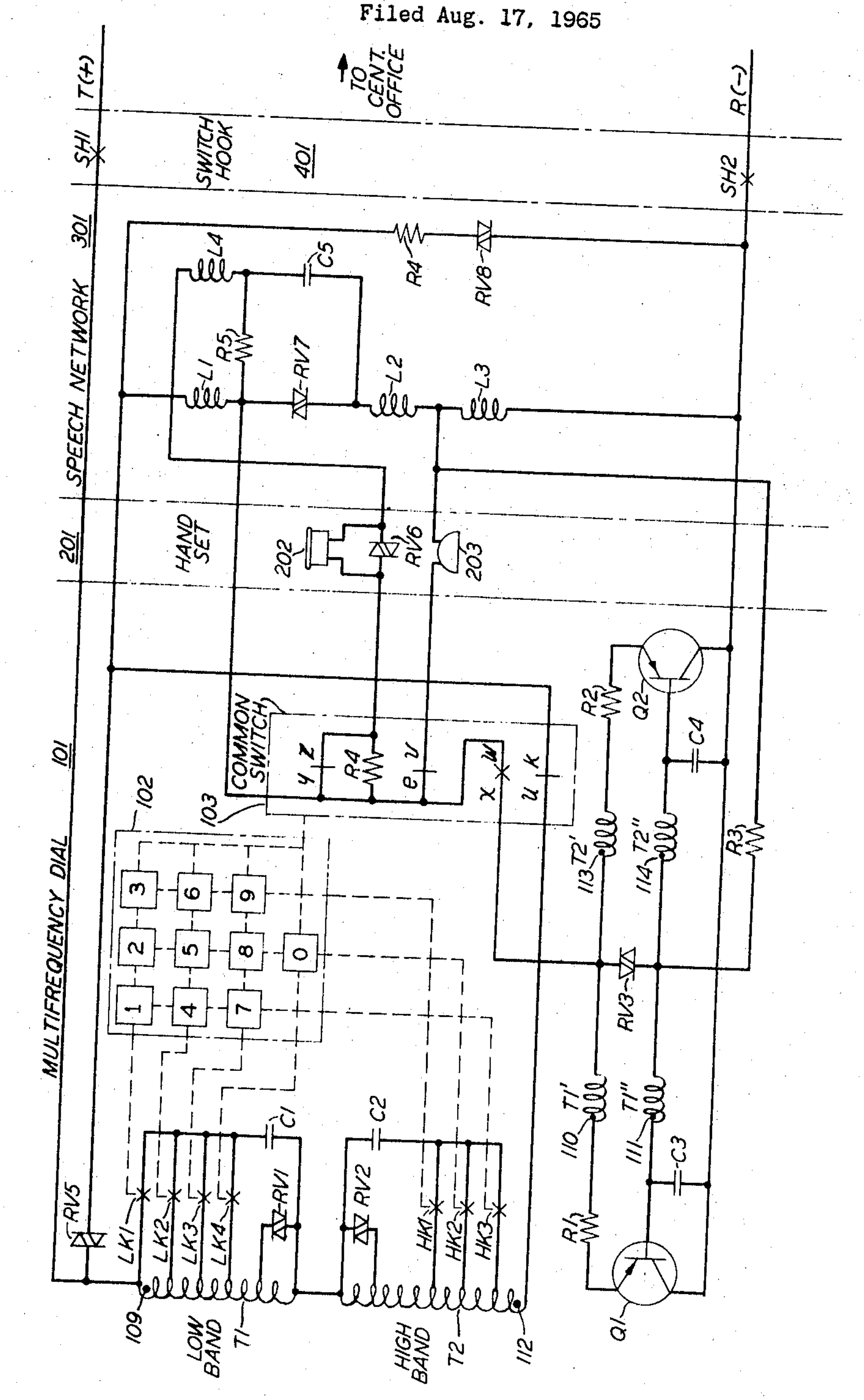
INVENTORS J. L. FISCHER
W. E. HOSTETLER
BY E J Olnider
ATTORNEY United States Patent Office 3,447,096
Patented May 27, 1969

3,447,096
MULTIFREQUENCY SIGNAL GENERATOR

James L. Fischer, Carmel, and Willard E. Hostetler, Indianapolis, Ind., assignors to Bell Telephone Laboratories, Incorporated, New York, N.Y., a corporation of New York Filed Aug. 17, 1965, Ser. No. 480,273
Int. Cl. H03b *19/00, 1/04*
U.S. Cl. 331—49 2 Claims

ABSTRACT OF THE DISCLOSURE

In a multifrequency signal generator frequency pulling is avoided by employing a separate transistor oscillator for each of two signal bands. Spurious common frequency signal bursts generated by the two oscillators are suppressed by providing means for ensuring phase opposition between such spurious signals.

This invention relates to multifrequency signal generators and more particularly to pushbutton operated signal generators for telephone sets.

Pushbutton operated telephone dials that generate multifrequency dial signals are now in widespread commercial use. One well-known form of such a dial, termed a Touch-Tone dial, generates a coincident unique pair of oscillatory signals in response to the operation of a corresponding one of the pushbuttons in a pushbutton array. Each pair of such signals includes one signal from a relatively high frequency band and one signal from a relatively low frequency band, and each unique combination is indicative of a dialed digit in accordance with a frequency code.

In multifrequency dial apparatus it is known that interaction between the two signals of any simultaneously generated signal pair, commonly called "frequency pulling," is a function of the Q of the frequency determining coils of the oscillator circuit. Specifically, frequency pulling is inversely proportional to the product of the Q's of the tank coils. In a typical multifrequency generator circuit, a single transistor dual frequency oscillator is employed as shown for example by L. A. Meacham and F. West in Patent 3,184,554, issued May 18, 1965. The tank coils in an oscillator circuit such as that disclosed by Meacham and West are designed for relatively high values of Q, in the range of 20–35, for example. Consequently, frequency pulling is kept within acceptable limits.

In a new telephone set design, one commercial version of which is known as the Trimline set, the conventional telephone set base structure has been eliminated and the dial mechanism is mounted in the handset. In such an arrangement, space is at a premium and particularly in the case of a pushbutton or multifrequency dial, substantial redesign, both mechanical and electrical, has been found necessary to permit housing the dial in the relatively small space that is available. As a part of the redesign indicated, a different form of transformer or tank coil, termed a "half-height" coil, is employed. The half-height coils have been proved as generally satisfactory for the intended purpose in most respects and are sufficiently reduced in size to fit properly within the handset mounting. The Q of such coils is substantially lower than for conventional coils, however, and, as a result, an unacceptable level of signal interaction or frequency pulling occurs in the otherwise conventional single-transistor oscillator circuits.

Accordingly, one object of the invention is to improve the operating characteristics of multifrequency signal generators of the type that are suitable for telephone handset mounting.

Another object of the invention is to facilitate the use of relatively low Q tank coils in multifrequency signal generator circuits.

These and other objects are attained in an illustrative embodiment of the invention wherein a pair of oscillators is employed in a pushbutton operated multifrequency signal generating telephone dial circuit in contrast to the single dual function oscillator utilized heretofore. Although two oscillator circuits are used, each employing a respective transistor, the circuits are uniquely interconnected, sharing a common output point and a common biasing circuit, still retaining, however, substantial isolation between the two circuits insofar as signal interaction or frequency pulling is concerned.

Accordingly, one feature of the invention is a pushbutton operated multifrequency signal generator circuit wherein an interconnected pair of transistor oscillators is responsive to the operation of a single pushbutton to the end that a coincident unique dual frequency signal burst is applied to a common output point, indicative, in terms of the frequency combination, of a preselected digit corresponding to the pushbutton operated.

Another feature of the invention is a dial-in-handset telephone employing a pushbutton dial utilizing relatively low Q coils wherein frequency pulling is virtually eliminated.

A further feature of the invention is a multifrequency signal generator having a pair of interconnected transistor oscillators wherein both oscillators are operatively responsive to the depression of a single pushbutton on a pushbutton dial and wherein both oscillators share a common output point and a common biasing circuit.

These and other objects and features of the invention will be fully apprehended from the following detailed description of an illustrative embodiment of the invention and from the appended drawing.

In the drawing, the circuitry for a multifrequency-signaling, dial-in-handset type telephone is shown divided into four major portions, a multifrequency dial 101, a handset proper 201, a speech network 301 and a pair of switchhook contacts 401. The circuit portions shown are connectable to a central office, not shown, in conventional fashion by way of a tip lead T and a ring lead R through the operation of switchhook contacts SH1 and SH2.

*Circuit description*

Multifrequency dial 101 comprises a number of subassemblies and circuits including a pushbutton array 102, a first ferrite transformer with three mutually coupled windings T1, T1′ and T1″, and a second ferrite transformer with mutually coupled windings T2, T2′ and T2″. Windings T1 and T2 are the main tank windings for the oscillator portion of the circuit. Windings T1′ and T2′ are termed emitter windings, indicating their connection in the emitter circuits of transistors Q1 and Q2, respectively, and coils T1″ and T2″ are termed base windings, indicating their connection in the base circuits of transistors Q1 and Q2, respectively. The frequency determining windings are the main tank windings T1 and T2.

One of the switch contacts LK1 through LK4 and one of the switch contacts HK1 through HK3 are operated simultaneously by the depression of any one of the pushbuttons in pushbutton array 102. Details of such an arrangement are shown by C. E. Mitchell in Patent 3,035,211, issued May 15, 1962. As indicated, a particular tap on main tank winding T1 is connected into the low band tank circuit by each of the switches LK1 through LK4, and, similarly, a particular tap on main tank winding T2 is connected into the high band tank circuit by the operation of each of the switches HK1 through HK3. The particular frequency generated in the tank circuits is determined for the low band by the resonant frequency of the selected coil tap from main tank winding T1 and capacitor C1, whereas the frequency in the high band is established by the resonant frequency of the selected coil tap from main tank winding T2 and capacitor C2. Varistors RV1 and RV2 serve as amplitude limiters. Common switch 103, which includes break contacts *y–z*, *e–v* and *u–k* and make contact *x–w*, is operated by the depression of any single one of the pushbuttons in pushbutton array 102. The function of these individual contacts is discussed in the operational description set forth hereinafter.

Transistors Q1 and Q2 are utilized, in accordance with the principles of the invention, to sustain oscillations started by excitation of the low band and high band tank circuits, respectively. Capacitors C3 and C4, each connected across the base collector junction of the transistors Q1 and Q2, respectively, are utilized to suppress parasitic oscillations. Varistor RV3 and resistor R3 are the components of a shared D-C biasing circuit that provides biasing potential across the base-to-emitter junction of both transistors. The collectors of both transistors Q1 and Q2 operate into a common load in that both are connected directly to ring lead R.

The varistor RV5 may properly be termed an excitation varistor in that it shunts both frequency determining networks and maintains a constant voltage drop across these networks substantially independent of current flow, ensuring the availability of a standard preselected level of energy to the tank circuits when switching or dialing occurs.

The portions of handset 201 other than the multifrequency dial are broadly conventional and include a receiver 202, shunted by a protective varistor RV6, and a transmitter 203. The dial-in-handset speech network 301, although differing from prior art telephone speech networks in some respects, is substantially conventional in both function and in circuit configuration. This network includes the usual hybrid coil consisting of windings L1 through L4, varistor RV7, capacitor C5, resistor R4 and loop equalization varistor RV8.

*Circuit operation*

Handset 201 is removed from switchhook 401 in conventional fashion to close switchhook contacts SH1 and SH2. The depression of a single pushbutton in the pushbutton array 102 effects the selection of a coil tap from winding T1 and the selection of a coil tap from winding T2 by the operation of one of the contacts LK1 through LK4 and by the operation of one of the contacts HK1 through HK3. Common switch 103 is also operated whenever a dial pushbutton is depressed. Break contact *y–z* opens to place resistor R4 in series with receiver 202 in order to limit the dialing feedback level. Break contact *e–v* opens to remove transmitter 203 from the circuit during dialing. Make contact *x–w* closes to complete a D-C conducting path from tip lead T through varistor RV5, inductor L1, varistor RV3, resistor R3 and inductor L3 to ring lead R. D-C biasing is thus applied by a common circuit to each of the transistors Q1 and Q2. Break contact *u–k* opens to remove the series-connected tank windings T1 and T2 from being connected across varistor RV5. This interrupts the D-C excitation current in the tank windings and shock-excites both the low band and the high band tank circuits which results in the immediate generation of the two signal frequencies. These oscillations are sustained by transistors Q1 and Q2. The signal outputs, taken from the collectors of transistors Q1 and Q2, are applied directly to ring lead R for transmission to the central office.

In prior art multifrequency generators employing only a single transistor, frequency interaction, or frequency pulling, is held within acceptable limits or is virtually eliminated by the utilization of relatively high Q coils. As indicated above, however, insufficient space exists in a dial-in-handset telephone to permit the utilization of high Q coils. In accordance with the invention, frequency interaction or pulling is eliminated, as shown, by employing two oscillators, each substantially isolated from the standpoint of the signals generated yet interconnected by D-C conductive paths and served by a common bias circuit.

Although the problem of frequency pulling is eliminated, it is possible under certain conditions in an arrangement in accordance with the invention to generate inadvertently an unwanted common frequency signal in both oscillators. When such a signal is within the allowed frequency band, or "in-band" it is evident that some means must be employed to eliminate it in order to preclude the transmssion of a spurious signal.

More specifically, the interrelation of the switches operated by the depression of each pushbutton, as described, is such that when a button is "feathered" or depressed slowly so that all switching functions except the opening of contacts *u–k* have occurred, a common frequency in-band oscillation is generated by both oscillators. In accordance with the invention, such unwanted in-band oscillations are eliminated or reduced to a level that precludes transmission and interference with bona fide signals. This reduction or elimination is achieved, in accordance with the invention, by properly phasing the tank, emitter and base coil windings. If the coils are phased in the manner shown, so that the dot indications 109, 110 and 111 on coils T1, T1′ and T1″ in the low band network correspond, and similarly so that the dot indications 112, 113 and 114 on coils T2, T2′ and T2″ in the high band network correspond, in-band signals of a common frequency occurring in each network will be phased approximately 180° apart and substantial cancellation will result. Cancellation of in-band oscillations is further ensured, in accordance with the invention, by a proper selection of emitter resistors R1 and R2. The components of the two frequency determining networks are selected to ensure a somewhat greater amplitude for signals generated in the high frequency band than for signal generated for the low frequency band in order to compensate for the greater line attenuation experienced by signals at the higher frequencies. Consequently, to achieve complete cancellation of in-band signals under the conditions indicated, such signals must be of substantially equal amplitude. The desired equal amplitude is achieved, in accordance with the invention, by proportioning resistors R1 and R2 with regard to the number of tank turns across which amplitude limiting occurs via RV1 and RV2 so that the effective emitter resistance magnitude of both transistor circuits is the same.

It is to be understood that the embodiment described herein is merely illustrative of the principles of the invention. Various modifications thereto may be effected by persons skilled in the art without departing from the spirit or scope of the invention.

What is claimed is:

1. Multifrequency signal generating apparatus comprising, in combination, first and second oscillator circuits each including a respective transistor having base, emitter and collector electrodes; first and second networks of frequency determining elements; a common biasing circuit for said oscillator circuits substantially mutually isolating said oscillator circuits, said biasing circuit includng first and second termnals having a nonlinear impedance element connected therebetween; first and second means, each including a respective inductive element, and each connecting a respective one of said emitter electrodes to said first terminal; second and third means, each including a respective inductive element, and each connecting a respective one of said base electrodes to said second terminal; common switching means for connecting a predetermined set of frequency determining elements from said first network into said first circuit and a predetermined set of frequency determining elements from said second network into said second circuit, for applying a bias potential across said terminals and for shock exciting said networks, thereby to generate a first signal burst at a first frequency and a first amplitude and a substantially simultaneous second signal burst at a lesser frequency and a lesser amplitude, and means for applying said first and second signal bursts from said collector electrodes to a common output point.

2. Apparatus in accordance with claim 1 including means for suppressing any common-frequency, parasitic signal bursts generated by said first and second networks and said first and second oscillator circuits, said last named means including first and second resistive elements each forming a portion, respectively, of said first and second means, said resistive elements being proportioned to ensure substantially equal amplitudes for said last named signal bursts, and each of said inductive elements and each of said elements of said networks being connected with respect to each other of said last two named elements as to ensure substantial phase opposition and mutual cancellation between said last named signal bursts.

References Cited

UNITED STATES PATENTS

| | | | |
|---|---|---|---|
| 3,064,084 | 11/1962 | Meacham | 179—84 |
| 3,100,245 | 8/1963 | Feldman | 179—84 |

KATHLEEN H. CLAFFY, *Primary Examiner.*

W. A. HELUESTINE, *Assistant Examiner.*

U.S. Cl. X.R.

179—84; 331—105, 185